(12) United States Patent
Gibble et al.

(10) Patent No.: US 8,528,329 B2
(45) Date of Patent: Sep. 10, 2013

(54) METHOD FOR REDUCING DIESEL ENGINE EMISSIONS, AND DIESEL ENGINE

(75) Inventors: John C. Gibble, Greencastle, PA (US); Timothy Suder, Greencastle, PA (US)

(73) Assignee: Mack Trucks, Inc., Greensboro, NC (US)

( * ) Notice: Subject to any disclaimer, the term of this patent is extended or adjusted under 35 U.S.C. 154(b) by 439 days.

(21) Appl. No.: 12/747,910

(22) PCT Filed: Jan. 8, 2008

(86) PCT No.: PCT/US2008/050466
§ 371 (c)(1), (2), (4) Date: Jun. 12, 2010

(87) PCT Pub. No.: WO2009/088506
PCT Pub. Date: Jul. 16, 2009

(65) Prior Publication Data
US 2010/0300089 A1   Dec. 2, 2010

(51) Int. Cl.
*F02B 33/44* (2006.01)

(52) U.S. Cl.
USPC .......................... 60/605.2; 60/602; 60/605.1

(58) Field of Classification Search
USPC ...................... 60/605.2, 602, 605.1
See application file for complete search history.

(56) References Cited

U.S. PATENT DOCUMENTS

| 5,890,359 | A | 4/1999 | Enander |
| 5,934,263 | A | 8/1999 | Russ |
| 6,338,245 | B1 | 1/2002 | Shimoda et al. |
| 6,467,270 | B2 | 10/2002 | Mulloy et al. |
| 6,625,985 | B2 | 9/2003 | Shirakawa |
| 7,076,953 | B2 | 7/2006 | Kreso |
| 7,237,381 | B2 | 7/2007 | Kolavennu et al. |
| 7,765,793 | B2 * | 8/2010 | Nishiyama et al. ............. 60/280 |
| 2006/0144045 | A1 | 7/2006 | Schroeder et al. |
| 2007/0271918 | A1 | 11/2007 | Nishiyama |

FOREIGN PATENT DOCUMENTS

| WO | 2007076038 A1 | 7/2007 |
| WO | 2007107865 A1 | 9/2007 |
| WO | 2007136142 A1 | 11/2007 |

OTHER PUBLICATIONS

International Search Report for corresponding International Application PCT/US2008/050466.
European Search Report for corresponding European App. EP 08 70 5768.
Japanese Official Action (Jun. 21, 2012) from corresponding Japanese Application 2010-542210.
Japanese Application Publication No. 2005-273594, Oct. 6, 2005, Toyota Motor Corp. (with English Abstract).
Japanese Application Publication No. 2000-205055, Jul. 25, 2000, Mazda Motor Corp (with English Abstract).
JP 2011-152870, Jun. 5, 2001, Toyota Motor Corp.

(Continued)

*Primary Examiner* — Ching Chang
(74) *Attorney, Agent, or Firm* — WRB-IP LLP

(57) ABSTRACT

A method for controlling emissions during low-load diesel engine operation is provided. The engine includes at least one piston movable in a cylinder between a top dead center and a bottom dead center position, a fuel injector for injecting fuel into the cylinder, and a variable geometry turbine through which exhaust from the engine is adapted to flow. According to the method, the engine is operated at low load, NOx emissions are measured at an exhaust of the engine, and a variable geometry turbine inlet opening size is controlled responsive to NOx emissions measurements so that NOx emission levels are controlled.

25 Claims, 1 Drawing Sheet

(56) References Cited

OTHER PUBLICATIONS

Japanese Official Action from corresponding Japanese Application No. 2010-542210.

Japanese Official Action (Dec. 11, 2012) from corresponding Japanese Application 2010-0542210.

Japanese Application Publication No. 2001-082233, Mar. 27, Hino Motors Ltd (with English Abstract) corresponding to US 6338245.

* cited by examiner

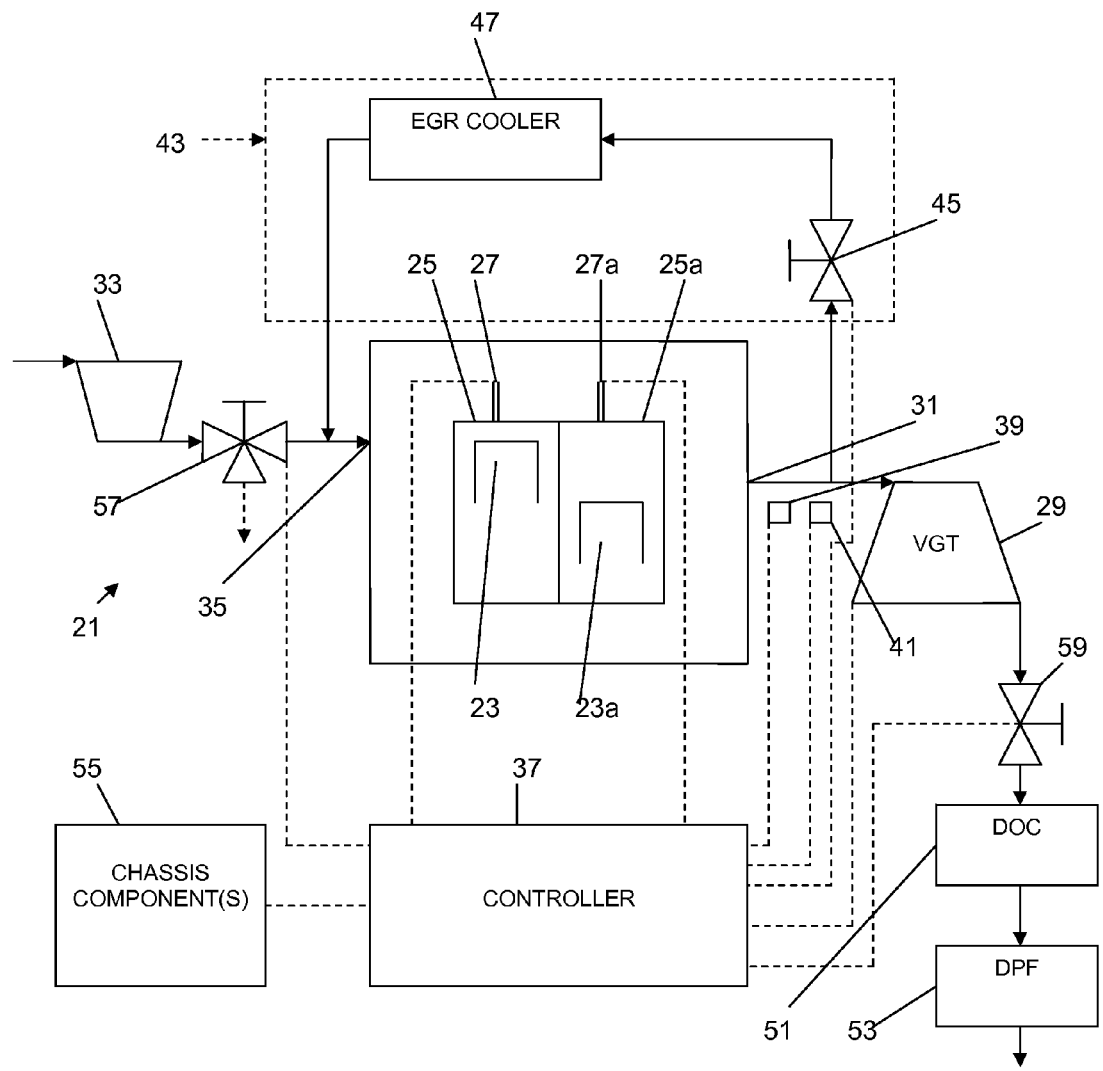

METHOD FOR REDUCING DIESEL ENGINE EMISSIONS, AND DIESEL ENGINE

BACKGROUND AND SUMMARY

The present invention relates generally to methods and an engine for reduced diesel emissions.

The stringent emissions regulations imposed by United States and European regulatory agencies have progressively reduced the amount of emissions allowed in the exhaust gases of diesel engines. Recent proposals from regulating bodies have mandated that engine manufacturers maintain a maximum NOx emission of 30 g/hr during extended idling conditions.

Current known emissions control strategies are unable to achieve this target without damage to engine components. For example, current methods of implementing exhaust gas recirculation (EGR) at idle will tend to cause EGR cooler fouling and engine sludge and varnishing. Repercussions from this can vary from component replacement to complete engine failure. Also, during engine idle, there is a danger of after-treatment system damage. The cooler exhaust temperatures and higher hydrocarbon environment can cause Diesel Oxidation Catalyst (DOC) plugging, and the DOC and Diesel Particulate Filter (DPF) can both collect a combination of particulate matter, hydrocarbons, and water during extended periods of idling. This collection can cause extreme back pressure leading to engine damage or after-treatment damage and, if there is enough hydrocarbon present in the system, when the exhaust gas temperature rises to a sufficiently high level, the unburned fuel can ignite and cause the after-treatment system to melt down or crack, thereby destroying it.

Also, the combustion temperature in a diesel engine is strongly influenced by the intake air temperature and the air/fuel ratio. At a low thermal state, the hydrocarbon emissions resulting from incomplete combustion and lubricating oil passage or "slobber" will have an increased tendency to condense because the surfaces are cool and the hydrocarbons are of higher molecular weight than usual for a hotter combustion. The low thermal state is usually associated with high A/F ratios, low ambient temperatures, and low fueling rates leading to both low combustion temperatures due to the chemical kinetics and a low "bone" temperature (core metal temperatures) absorbing a larger proportion of the heat energy and resulting in an additional lowering of combustion temperatures. Although this condition is not mechanically stressful to the engine, it does result in less complete combustion and more hydrocarbon emissions. The low thermal state of the engine promotes the condensation of water, which is a byproduct of all combustion. The water dissolves sulfur and nitrogen compounds thus creating an acidic solution. The coating of liquid hydrocarbons and acids onto a layer of carbonaceous soot can render the EGR cooler ineffective as a result of diminished heat transfer efficiency (fouling) and may also incur plugging which restricts EGR gas flow area.

While operators might connect their vehicles to external or auxiliary power supplies in some circumstances, instead of idling their engines, to do so it is necessary that the vehicle be near an external or auxiliary power supply. These methods inherently reduce emissions but the primary purpose for their implementation is to reduce fuel consumption of the vehicle.

It is desirable to provide a technique for reducing engine emissions when the engine operates at low loads or idles. As there is no "throttle" in most diesel applications, idle can be considered to be the condition when the engine operates at a load required to overcome friction torque and accessory loading from engine and chassis systems.

According to an aspect of the present invention, a method for controlling emissions during low-load diesel engine operation is provided, the engine comprising at least one piston movable in a cylinder between a top dead center and a bottom dead center position, a fuel injector for injecting fuel into the cylinder, and a variable geometry turbine through which exhaust from the engine is adapted to flow. According to the method, the engine is operated at low load, and a variable geometry turbine inlet opening size is controlled so that NOx emission levels are controlled while the engine is operated at low load.

According to another aspect of the present invention, a diesel engine comprises at least one piston movable in a cylinder between a top dead center and a bottom dead center position, a fuel injector for injecting fuel into the cylinder, a variable geometry turbine through which engine exhaust is adapted to flow, a sensor for measuring NOx emissions at an exhaust of the engine, and a controller arranged to control a variable geometry turbine inlet opening size during low load operation of the engine responsive to NOx emissions measurements so that NOx emission levels are controlled.

BRIEF DESCRIPTION OF THE DRAWING

The features and advantages of the present invention are well understood by reading the following detailed description in conjunction with the drawing in which like numerals indicate similar elements and in which:

FIG. 1 is a schematic view of an engine according to an aspect of the present invention.

DETAILED DESCRIPTION

A diesel engine 21 according to an aspect of the present invention is seen in FIG. 1 and comprises at least one piston 23 movable in a cylinder 25 between a top dead center (TDC) and a bottom dead center (BDC) position. A fuel injector 27 is provided for injecting fuel into the cylinder, ordinarily proximate TDC, and the combination of temperature and pressure causes the fuel to combust and force the piston toward the BDC position. The piston 23 is ordinarily linked to a crankshaft (not shown) that is turned as the piston reciprocates.

A variable geometry turbine (VGT) 29 is provided downstream of an exhaust 31 of the engine 21 through which exhaust from the cylinder 25 is adapted to flow. The VGT 29 is typically part of a turbocharger arrangement including a compressor 33 that is arranged upstream of the inlet 35 for boosting engine intake air pressure. The VGT 29 has conventional VGT vanes (not shown) for varying the size of an inlet opening of the VGT. The positions of the vanes are controllable by a controller 37 such as an ECU to vary the size of the inlet opening of the VGT.

A sensor 39 can be provided for measuring NOx emissions at an exhaust of the engine 21. A sensor 41 can be provided for measuring temperature at the exhaust of the engine 21.

The engine 21 can also comprise an EGR system 43 with an EGR valve 45 disposed between an inlet 35 and the exhaust 31 of the engine. The EGR system 43 will ordinarily also include an EGR cooler 47.

The controller 37 can be arranged to control the VGT 29 inlet opening size during low load operation of the engine 21 responsive to NOx emissions measurements so that NOx emission levels are controlled, ordinarily for purposes of reducing NOx levels. "Low load" is defined herein to mean no accelerator pedal demand applications. For most diesel engines, these no demand applications involve engine speeds wherein the crankshaft turns at speeds between 500-2000 rpms, where normal engine idle speeds are usually in the range of 650-1200 rpms.

The controller 37 can also be arranged to open the EGR valve 45 so that NOx emission levels are controlled, ordinarily for purposes of reducing NOx levels. Ordinarily, the controller will control VGT 29 inlet opening size together with the degree of opening of the EGR valve 45 to reduce NOx emissions. Operation of the engine 21 at low load with the VGT 29 inlet opening size reduced and the EGR valve 45 opened will occasionally be referred to herein as low load closed loop NOx control mode, it being understood that the loop is not necessarily actually closed, and operation in that mode is not limited to controlling NOx.

In a method for controlling emissions during low-load diesel engine 21 operation, the engine is operated at low load, NOx emissions are measured with a NOx sensor 39 at the exhaust of the engine. The controller 37 controls the VGT 29 inlet opening size responsive to NOx emissions measurements so that NOx emission levels are controlled, ordinarily for purposes of reducing NOx levels. Ordinarily, to reduce NOx emissions, VGT 29 inlet opening size is reduced to at least proximate a closed turbine nozzle gap, usually about 0-7.5% of maximum turbine nozzle gap. To reduce NOx emissions, the controller 37 ordinarily also opens the EGR valve 45 at the same time that the VGT 29 inlet opening size is reduced, usually to about 25-60% of a maximum position of the EGR valve.

Ordinarily, increasing recirculation of exhaust gas flow by opening the EGR valve 45 and closing the VGT 29 inlet opening size would lead to higher hydrocarbon and particulate matter emissions. Hydrocarbon and particulate matter emissions can be reduced in conventional arrangements by advancing timing of fuel injection and/or increasing fuel injection pressure at the fuel injector 27 nozzle opening. Advancing fuel injection timing and increasing fuel injection pressure both tend to have the effect of permitting better fuel atomization and pressurization so that a more complete combustion event occurs. However, in conventional arrangements, this reduction in hydrocarbon and particulate matter emissions is achieved only at the expense of a drastic increase in NOx. In an aspect of the present invention, a substantial EGR flow rate is provided so that there is a relatively high concentration of inert gas in the cylinder prior to combustion, tending to result in lower combustion temperatures. By an appropriate balancing of fuel injection timing and/or pressure with EGR flow rate, NOx can be controlled and hydrocarbon and particulate matter production can be minimized. In an aspect of the present invention, fuel is injected by the fuel injector 27 at least 5 degrees before top dead center of the piston 23.

The VGT 29 inlet opening size and EGR valve 45 opening can also be controlled so that a temperature of engine exhaust is increased. By increasing engine exhaust temperatures, risk of component damage due to hydrocarbon and water condensation on components such as the EGR cooler 47 and valve train components (not shown) can be reduced. Additionally, a temperature of engine exhaust can be increased to a boundary temperature for a Diesel Oxidation Catalyst (DOC) 51 downstream of the VGT so that components of an exhaust after-treatment system such as a diesel particulate filter 53 can regenerate at low loads or idle speeds. In existing systems, by contrast, extended low load operation can cause after-treatment component damage. Selective Catalytic Reduction (SCR) system applications will also have target thermal operation zones for catalyst activity, and the thermal control facilitated by an aspect of the present invention can enable NOx conversion at lower loads.

The VGT 29 inlet opening size and EGR valve 45 opening can also be controlled so that temperatures and pressures in the engine 21 tend to be increased. Increased temperature and pressure in the engine 21 tends to reduce problems associated with oil "slobber" in the engine, i.e., the passing of oil around piston rings and eventually into the exhaust manifold and turbocharger, which can cause severe engine damage. The increased pressure, particularly, is useful in reducing slobber because it tends to rebalance piston rings to promote scraping of the cylinders and keep oil out of the combustion chamber and, therefore, out of the exhaust. Increased temperatures assist in ensuring that, if oil does pass by the piston rings, it does not tend to stay in a pool but, rather, tends to burn off.

When one or more of the VGT 29 inlet opening size, EGR valve 45 opening, fuel injection timing, and fuel injection pressure are controlled so that temperatures in the engine are increased, increased heat rejection of the system to engine coolant can be used to warm up the engine and to maintain warm conditions in a vehicle passenger compartment for heating purposes. Thus, when used in a vehicle, the engine 21 be run at a lower idle speed and/or lower loads to warm up the engine or maintain warm conditions, thereby tending to save fuel and controlling, ordinarily reducing, overall emissions. Additionally, decreased VGT 29 wheel speed and lower mass flow through the engine 21 tends to result in operation with less noise.

With many NOx sensors 39, operation of the NOx sensor during low load is not possible due to the risk of water condensation and sensor damage associated with low operating temperatures. When one or more of the VGT 29 inlet opening size, EGR valve 45 opening, fuel injection timing, and fuel injection pressure are controlled so that temperatures in the engine are increased, an increased temperature of the exhaust will allow, under most low load conditions, the activation of the NOx sensor 39. The NOx sensor 39 is therefore available for closed-loop control of the engine 21.

Ordinarily, the NOx concentration measured by the NOx sensor 39 will be compared to a table in the controller 37 which represents a target NOx concentration which, when combined with engine mass flow will yield a desired emission level, such as less than or equal to 30 g/hour. If the emission of NOx increases beyond this range, the EGR valve 45 can be opened in an attempt to control emissions, ordinarily in order to reduce them. The VGT 29 inlet opening size can also be reduced (if not at zero gap already) to control NOx, ordinarily to reduce NOx. This mode of control of emissions can be useful toward ensuring compliance with emissions regulations in the presence of engine to engine variability.

The closed loop NOx control can also aide in reducing hydrocarbon and particulate matter emissions. If the NOx reaches a level that is deemed too low, it can mean that temperatures in the system are too low, which can increase the risk of component damage. To combat the hydrocarbon and particulate matter emissions from a combustion regime that produces low NOx, in addition to or instead of advancing fuel injection timing or increasing fuel injection pressure at the fuel injector 27, the EGR valve 45 can be closed and if necessary the VGT 29 inlet opening size will increase.

Smooth transition out of low load closed loop NOx control mode to normal engine operation at higher loads can be facilitated by monitoring one or more chassis parameters. This can be useful to avoid engine stumble or hesitation and to minimize any risk that the VGT pressure balance upon leaving low load closed loop NOx control mode would hold the vanes shut, and the actuator would not be strong enough to open the vanes. For example, output signals from chassis components 55 such as a transmission gear, a parking brake, a throttle, a torque sensor for sensing torque levels and rate of change, and an engine speed sensor can be monitored by the controller 37. After a change in one or more of these components is detected, it may indicate that transition to the higher load condition is imminent and transition from the low load closed loop NOx control mode can be commenced. Commencement of the transition can be delayed a predetermined length of time to ensure that the detected output signal is not merely transitory.

According to a further aspect of the present invention, in an engine 21 having multiple cylinders 25, 25a, etc., the total number of engine cylinders operating under combustion during a given engine revolution can be reduced, thereby tending to reduce engine emissions. In this way, total mass flow in the engine can be reduced, and temperature can be reduced, tending to result in less NOx production. It is anticipated that this solution will be particularly useful during low load, high engine speed operation.

According to a further aspect of the present invention, air discharged from the compressor 33 can be redirected, such as by operating a diversion valve 57 downstream of the compressor with the controller 37. In this way, air flow through the engine can be reduced, thereby decreasing g/hr emissions. Additionally, redirecting compressor 33 air can increase temperatures. Air flow through the engine 21 can also be reduced, and temperatures can be increased, by providing a variable restriction device such as a valve 59 to increase exhaust backpressure.

According to a further aspect of the present invention, multiple fuel injection events can be implemented to provide a more refined control of combustion to better control thermal conditions and emission levels.

According to a further aspect of the present invention, a variant combustion technique can be employed wherein the controller 37 can control fuel injectors 27, 27a, etc. in different cylinders 25, 25a, etc., such that high NOx advanced timing can be run in some cylinders while a low NOx reduced timing is run in other cylinders. In other words, fuel can be injected in the cylinders at different positions of pistons 23, 23a, etc., of different cylinders. An appropriate balancing of the timing can reduce the amount of hydrocarbons or particulate matter in one cylinder relative to another and allow for air that returns through the engine via EGR to be high NOx and low in hydrocarbons and particulate matter, which can benefit components without directly impacting tailpipe emissions.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for controlling emissions during low-load diesel engine operation, the engine comprising at least one piston movable in a cylinder between a top dead center and a bottom dead center position, a fuel injector for injecting fuel into the cylinder, and a variable geometry turbine through which exhaust from the engine is adapted to flow, the method comprising:
    operating the engine at low load;
    controlling a variable geometry turbine inlet opening size so that NOx emission levels are controlled while the engine is operated at low load, wherein variable geometry turbine inlet opening size is reduced to 0-7.5% of maximum turbine nozzle gap, and
    reducing hydrocarbon and particulate matter emissions by advancing fuel injection from a position before top dead center of the piston.

2. The method for controlling emissions according to claim 1, wherein, at low load, a crankshaft driven by the piston moves at 500-2000 rpm.

3. The method for controlling emissions according to claim 1, the engine comprising an EGR system with an EGR valve disposed between an inlet and the exhaust of the engine, the method comprising opening the EGR valve so that NOx emission levels are controlled.

4. The method for controlling emissions according to claim 3, comprising opening the EGR valve to 25-60% of a maximum position of the EGR valve.

5. The method for controlling emissions according to claim 4, comprising injecting fuel before top dead center of the piston.

6. The method for controlling emissions according to claim 5, comprising increasing fuel injection pressure at a fuel injection nozzle opening of the cylinder.

7. The method for controlling emissions according to claim 1, the engine comprising an EGR system with an EGR valve disposed between an inlet and an exhaust of the engine, the method comprising opening the EGR valve so that NOx emission levels are controlled.

8. The method for controlling emissions according to claim 7, comprising controlling EGR valve opening in response to NOx emission measurements.

9. The method for controlling emissions according to claim 7, comprising controlling variable geometry turbine inlet opening size and EGR valve opening so that a temperature of engine exhaust is increased.

10. The method for controlling emissions according to claim 9, controlling variable geometry turbine inlet opening size and EGR valve opening so that a temperature of engine exhaust is increased to a boundary temperature for a Diesel Oxidation Catalyst downstream of the variable geometry turbine.

11. The method for controlling emissions according to claim 1, comprising injecting fuel before top dead center of the piston.

12. The method for controlling emissions according to claim 11, comprising injecting fuel at least 5 degrees before top dead center of at least one piston of the engine.

13. The method for controlling emissions according to claim 1, comprising increasing fuel injection pressure at a fuel injection nozzle opening of the cylinder.

14. The method for controlling emissions according to claim 1, comprising injecting fuel at least 5 degrees before top dead center of the piston.

15. The method for controlling emissions according to claim 1, comprising reducing hydrocarbon and particulate matter emissions by increasing fuel injection pressure at a fuel injection nozzle opening of the cylinder.

16. The method for controlling emissions according to claim 1, comprising reducing hydrocarbon and particulate matter emissions by increasing fuel injection pressure at a fuel injection nozzle opening of the cylinder.

17. The method for controlling emissions according to claim 1, comprising monitoring at least one chassis parameter and, after detection of a change in the chassis parameter, beginning transition to high load operation of the engine, including adjusting the variable geometry turbine inlet opening size for high load operation.

18. The method for controlling emissions according to claim 17, the chassis parameter comprises at least one of manipulation of a transmission gear, manipulation of a parking brake, manipulation of a throttle, sensation of a torque level, sensation of torque rate of change, and sensation of engine speed.

19. The method for controlling emissions according to claim 1, wherein the engine has multiple cylinders, the method comprising operating the engine such that combustion occurs in fewer than all of the multiple cylinders.

20. The method for controlling emissions according to claim 1, wherein the engine comprises a compressor upstream from an engine inlet for discharging air to the engine inlet, the method comprising redirecting air discharged from the compressor away from the engine inlet.

21. The method for controlling emissions according to claim 1, wherein the engine comprises multiple cylinders, the method comprising injecting fuel in the cylinders at different positions of pistons of different cylinders.

22. The method for controlling emissions according to claim 1, comprising measuring NOx emissions at an exhaust of the engine, and controlling the variable geometry turbine inlet opening size responsive to NOx emissions measurements so that NOx emission levels are controlled.

23. A diesel engine comprising:
   at least one piston movable in a cylinder between a top dead center and a bottom dead center position;
   a fuel injector for injecting fuel into the cylinder;
   a variable geometry turbine through which engine exhaust is adapted to flow;
   a sensor for measuring NOx emissions at an exhaust of the engine; and
   a controller arranged to control a variable geometry turbine inlet opening size during low load operation of the engine responsive to NOx emissions measurements so that NOx emission levels are controlled, wherein variable geometry turbine inlet opening size is reduced to 0-7.5% of maximum turbine nozzle gap, and the controller being arranged to control hydrocarbon and particulate matter emissions by advancing fuel injection from a position before top dead center of the piston.

24. The diesel engine as set forth in claim 23, comprising an EGR system with an EGR valve disposed between an inlet and the exhaust of the engine, the controller being arranged to open the EGR valve so that NOx emission levels are controlled.

25. The diesel engine as set forth in claim 23, wherein the controller is arranged to control EGR valve opening in response to NOx emission measurements.

* * * * *